United States Patent
Shirakawa

(10) Patent No.: US 6,781,952 B2
(45) Date of Patent: Aug. 24, 2004

(54) ESTABLISHMENT OF DESIGNATED S-PVC CONNECTION IN PNNI OPERATION ATM SWITCHING APPARATUS NETWORK

(75) Inventor: Toshikuni Shirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 414 days.

(21) Appl. No.: 09/991,654

(22) Filed: Nov. 26, 2001

(65) Prior Publication Data

US 2002/0064159 A1 May 30, 2002

(30) Foreign Application Priority Data

Nov. 27, 2000 (JP) ........................................ 2000-359642

(51) Int. Cl.[7] .............................................. H04L 12/26
(52) U.S. Cl. .................. 370/217; 370/395.2; 370/395.3
(58) Field of Search ............................... 370/217, 395.1, 370/395.2, 395.3

(56) References Cited

U.S. PATENT DOCUMENTS

2002/0097683 A1 * 7/2002 Yamamoto et al. ......... 370/242

FOREIGN PATENT DOCUMENTS

| JP | 63-82145 | 4/1988 |
| JP | 2933021 | 5/1999 |
| JP | 11-355310 | 12/1999 |
| JP | 2000-59374 | 2/2000 |

OTHER PUBLICATIONS

Chamberland, S., "On the Overlay Network Design Problem for the S–PVC Connections in ATM Networks", Global Telecommunications Conference, 2000, Nov.–Dec. 2000, vol. 3, pp. 1752–1755.*

* cited by examiner

Primary Examiner—Melvin Marcelo
(74) Attorney, Agent, or Firm—Whitham, Curtis & Christofferson, PC

(57) ABSTRACT

For establishing an S-PVC (soft private virtual connection) connection in a PNNI (private network-network interface) network of a plurality of peer groups, each of which includes at least an ATM (asynchronous transfer mode) switching apparatus as an ATM node, a first identifier and first designated route data associated with the S-PVC channel are set in each of the plurality of peer groups. In the ATM node in each of the plurality of peer groups, a call originating request including second designated route data and a second identifier is received and the first identifier and the second identifier are compared. A next call originating request containing third designated route data as the second designated route data and the second identifier is generated for a next node based on the first and second designated route data and the second identifier when the first identifier and the second identifier are coincident with each other. The next call originating request is transmitted to the next node. The above operations are repeated over each of the plurality of peer groups.

28 Claims, 5 Drawing Sheets

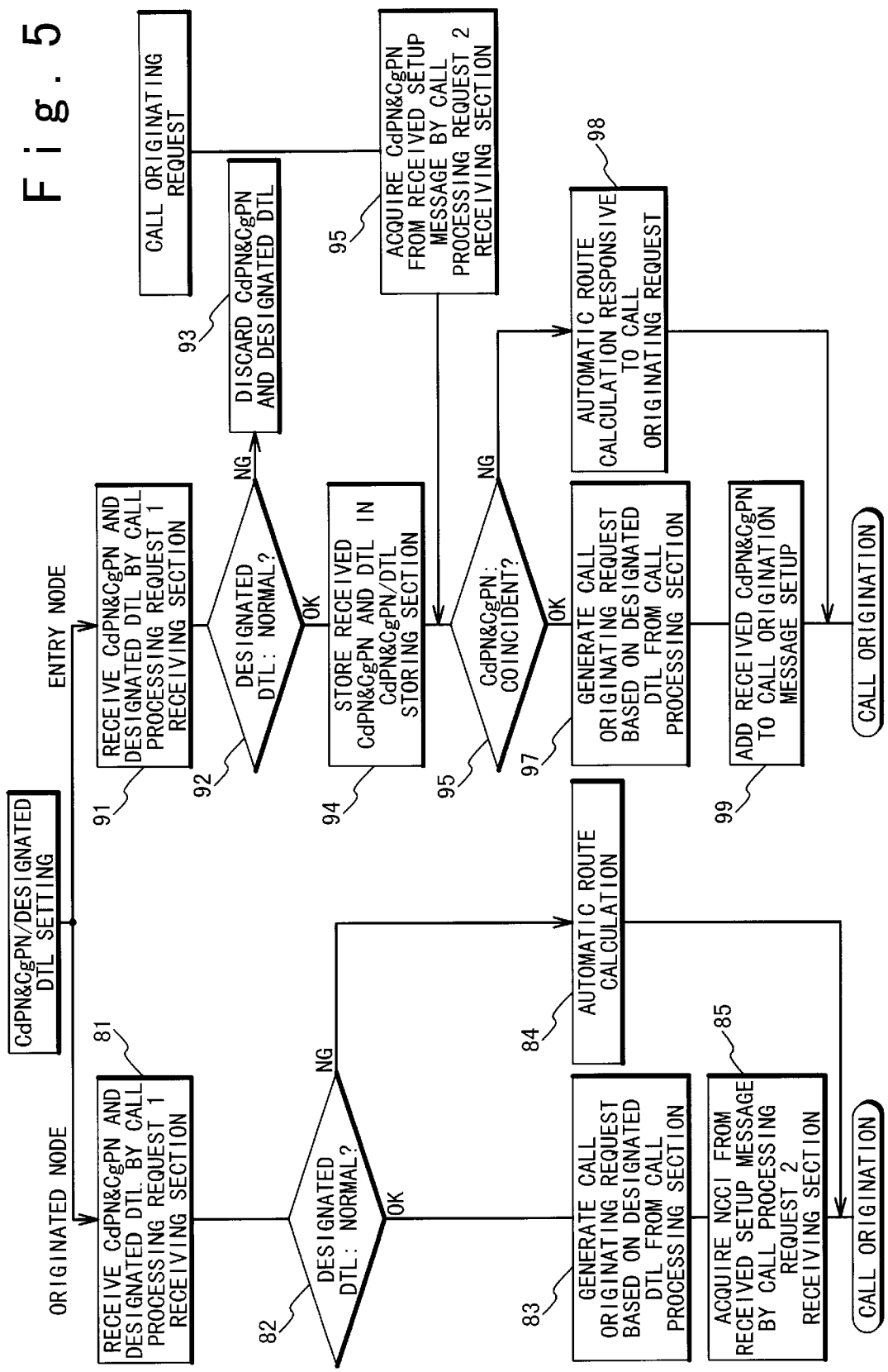

ESTABLISHMENT OF DESIGNATED S-PVC CONNECTION IN PNNI OPERATION ATM SWITCHING APPARATUS NETWORK

BACKGROUND OF THE INVENTION

1. Field of the Invention

The present invention relates to an ATM switching apparatus and a route setting system in an ATM switching apparatus network having the same. More particularly, the present invention relates to a system for setting S-PVC (Soft-Private Virtual Connection).

2. Description of the Related Art

When a network is operated by a plurality of ATM switching apparatuses, a PVC technique is known as a connection establishing scheme reflecting the intention of an operation administrator in the network. When the network is operated by using the ATM switching apparatuses of an identical vendor, a substitution route which is previously designated by a precut reroute function is used when a fault has occurred. Therefore, the securing of the route can be continued. However, when a network is operated by using the ATM switching apparatuses of a plurality of vendors, the route sometimes cannot be secured because the above function cannot be applied. For such a case, the system to which PNNI (Private Network-Network Interface) operation is applied is known in order to establish a substitution route in case of the fault in the network containing the ATM switching apparatuses of the plurality of vendors for making the network available continuously. In this system, the substitution route can be secured by a connection retry function in the case of the fault using the S-PVC scheme under the PNNI operation network.

However, in the conventional example, it is not possible to designate an optional route in accordance with an instruction of the operation administrator when a connection is established based on the S-PVC scheme under the PNNI operation in which a substitution route is considered. This is because a route is automatically selected based on a route calculation result which has been already obtained in an originated node in the route in issuance of a S-PVC connection establishing instruction in the PNNI network. In this way, when a S-PVC connection is established on the PNNI network, an optimal route is automatically determined using PNNI topology data of the originated node in the route by specifying a destination node. These conventional examples are described in "Private Network-Network Interface Specification Version 1.0", (The ATM Forum af-pnni-0055.000, March 1996).

In conjunction with the above description, a system and method for switching a route in case of occurrence of a fault of the ATM switching apparatus is described in Japanese Laid Open Patent Application (JP-A-Heisei 11-355310). In this reference, a substitution route is previously set for a present route between an origination switch and a termination switch. In this case, a band is not secured for the substitution route, and route data is managed. When a fault has occurred on the present route or in a relay switch, the route is switched from the present route to the substitution route and the band is secured. A fault condition on the present route and the substitution route is monitored and a remaining band of the substitution route is monitored. Based on the monitoring result, the route data is updated in the origination switch.

Also, a rerouting method of PVC in an ATM network and a network managing system is disclosed in Japanese Laid Open Patent Application (JP-P2000-59374A). In this reference, a substitution route is previously defined for PVC managed on the network managing system. The substitution route is used when a fault has occurred.

Also, a communication network fault recovering system is disclosed in Japanese Patent No. 2933021. In this reference, a network management system controls a transmission unit through a control line. When a fault has occurred, the network management system releases a band of a path which passes through a fault occurrence portion. Then, the network management system determines a substitution route based on fault recovery classes set for the respective paths.

A method of setting a PVC (permanent virtual circuit) is disclosed in Japanese Laid Open Patent Application (JP-A-Showa 63-82145). In this reference, a PVC is registered or released between packet switching apparatuses of a current use system and a substitution system. For this purpose, data necessary for setting the PVC is inputted from an operator console to a packet switching apparatus connected thereto and is temporality stored therein. A counter packet switching apparatus is determined based on the stored data and a notice packet is produced to have data necessary for the counter packet switching apparatus to set the PVC and is transmitted to the counter packet switching apparatus. The temporality stored data is registered on a retry process registering table in the packet switching apparatus when a reply packet to the notice packet is not received for a predetermined time from the counter packet switching apparatus or when the reply packet indicates a fault end. The retry process registering table is referred to for every time period, and the notice packet is produced again for the data registered on the retry process registering table and is retransmitted to the counter packet switching apparatus. The data registered on the retry process registering table is invalidated when the response packet indicates a normal end, and a retry count of the data registered on the retry process registering table is incremented by one, otherwise. When the retry count exceeds a predetermined value, the fault of the PVC setting is notified from the packet switching apparatus to the operator console.

SUMMARY OF THE INVENTION

An object of the present invention is to provide a system in which the connection of an optional route designated by an operation administrator can be established, and the continuation use of a route is guaranteed by a substitution route establishing function by using S-PVC on a PNNI network composed of a plurality of ATM switching apparatuses of vendors, even when a fault has occurred.

In an aspect of the present invention, a method of establishing an S-PVC (soft private virtual connection) connection in a PNNI (private network-network interface) network of a plurality of peer groups, each of which includes at least an ATM (asynchronous transfer mode) switching apparatus as an ATM node, is attained by (a) setting a first identifier and first designated route data associated with the S-PVC channel in each of the plurality of peer groups; by (b) in the ATM node in each of the plurality of peer groups, receiving a call originating request including second designated route data and a second identifier; by (c) comparing the first identifier and the second identifier; by (d) generating a next call originating request containing third designated route data as the second designated route data and the second identifier for a next node based on the first and second designated route data and the second identifier when the first identifier and the second identifier are coincident with each other; by (e) transmitting the next call originating request to the next node; and by (f) repeating the steps (b) to (e) over each of the plurality of peer groups.

Here, the first designated route data may be designated optionally.

Also, each of the first and second identifiers may be an NCCI (network call correlation identifier), or may contain at least one of a destination number CdPN: called party number) and a source number (CgPN: calling party number).

Also, when the one peer group includes the ATM node, the step (a) may includes the steps of (g) determining based on the first designated route data, whether establishment of the S-PVC connection is possible; and (h) setting the first designated route data and the first identifier when it is determined that the establishment of the S-PVC connection is possible. In this case, the first designated route data and the first identifier may be discarded when it is determined that establishment of the S-PVC connection is not possible.

In this case, also, in the step (g), whether the establishment of the S-PVC connection is possible may be determined based on whether the first designated route data is correct from network configuration data. Also, whether establishment of the S-PVC connection is possible may be determined based on whether resources are remained for the S-PVC connection.

Also, when the one peer group includes the ATM node and another ATM node, the step (a) include the step of (i) the ATM node determining based on the first designated route data, whether establishment of the S-PVC connection is possible; (j) the ATM node setting the first designated route data and the first identifier in the ATM node when it is determined that the establishment of the S-PVC connection is possible; and (k) the another ATM node setting the first designated route data and the first identifier in the another ATM node without determining whether the establishment of the S-PVC connection is possible. In this case, the step (i) include the step of determining whether the establishment of the S-PVC connection is possible, based on whether the first designated route data is correct from network configuration data. Also, whether establishment of the S-PVC connection is possible may be determined based on whether resources are remained for the S-PVC connection.

Also, the call originating request may be discarded when it is determined that the first identifier and the second identifier are not coincident with each other.

Also, an automatic routing process may be carried out to determine a route, when it is determined that the first identifier and the second identifier are not coincident with each other.

Also, the first and second designated route data may be designated based on a topology data of the PNNI network. In this case, when the first and second designated route data are described in DTL format, the third designated route data may be generated to have virtual logic hierarchical representation. Also, a portion of the designated route data corresponding to a lowest layer of virtual logic hierarchical representation is deleted, when the call originating request is received.

In another aspect of the present invention, a ATM switching apparatus includes a memory section which stores data indicating whether resources necessary for call origination are not used; a configuration management section which stores topology data indicating virtual hierarchical configuration of a PNNI network to which a peer group belongs, the ATM switching apparatus belonging to the peer group; a first receiving section which receives a call processing request having a first designated DTL (designated transit list) and a first identifier, and stores the first designated DTL and the first identifier in the memory section, when it is determined that establishment of an S-PVC (soft private virtual connection) connection is permitted; a second receiving section which receives a call originating request having a second designated DTL and a second identifier; and a call processing section which generates a new call originating request having a third designated DTL and the second identifier based on the first designated DTL and the second designated DTL, when the first and second identifiers are coincident with each other.

In this case, the first designated DTL may be designated optionally. Also, each of the first and second identifiers may be an NCCI (network call correlation identifier), or may contain at least one of a destination number CdPN: called party number) and a source number (CgPN: calling party number).

Also, the ATM switching apparatus may further include a configuration managing section which refers to the configuration management section to determine whether resources necessary for the establishment of the S-PVC connection are remained. In this case, the first receiving section stores the first designated DTL and the first identifier in the memory section, when it is determined that the resources necessary for the establishment of the S-PVC connection are remained. In this case, the first receiving section may discard the first designated DTL and the first identifier when it is determined that the resources necessary for the establishment of the S-PVC connection are remained. Also, the first receiving section may store the first designated DTL and the first identifier in the memory section when it is determined by another ATM switching apparatus which belongs to same peer group as the ATM switching apparatus that the resources necessary for the establishment of the S-PVC connection are remained.

Also, the ATM switching apparatus may further include an identifier processing section which compares the first identifier and the second identifier. At this time, the call processing section generates the new call originating request based on the first designated DTL and the second designated DTL, when the first and second identifiers are coincident with each other.

Also, the ATM switching apparatus may further include a transmitting section which transmits the new call originating request to a next node. Also, the call processing section may discard the call originating request when it is determined that the first identifier and the second identifier are not coincident with each other. Moreover, the ATM switching apparatus may further include a routing section which carries out an automatic routing process to determine a route, when it is determined that the first identifier and the second identifier are not coincident with each other. In addition, the call processing section deletes a portion of the second designated DTL corresponding to a lowest layer and generates the new call originating request having a third designated DTL based on the first designated DTL and the second designated DTL, when the first and second identifiers are coincident with each other.

BRIEF DESCRIPTION OF THE DRAWINGS

FIG. 5 is a flow chart showing the operation of the routing S-PVC setting system in the PNNI operation ATM switching apparatus network according to the second embodiment of the present invention.

DESCRIPTION OF THE PREFERRED EMBODIMENTS

Hereinafter, a routing S-PVC (Soft Private Virtual Connection) setting system in a PNNI (Private Network-Network Interface) operation ATM (Asynchronous Transfer Mode) switching apparatus network of the present invention will be described below in detail with reference to the attached drawings.

In the present invention, a connection is established based on a S-PVC scheme in a PNNI network composed of a plurality of peer groups. In this case, an optional route designated by an operation administrator is automatically selected and set with a priority.

Figure 1:
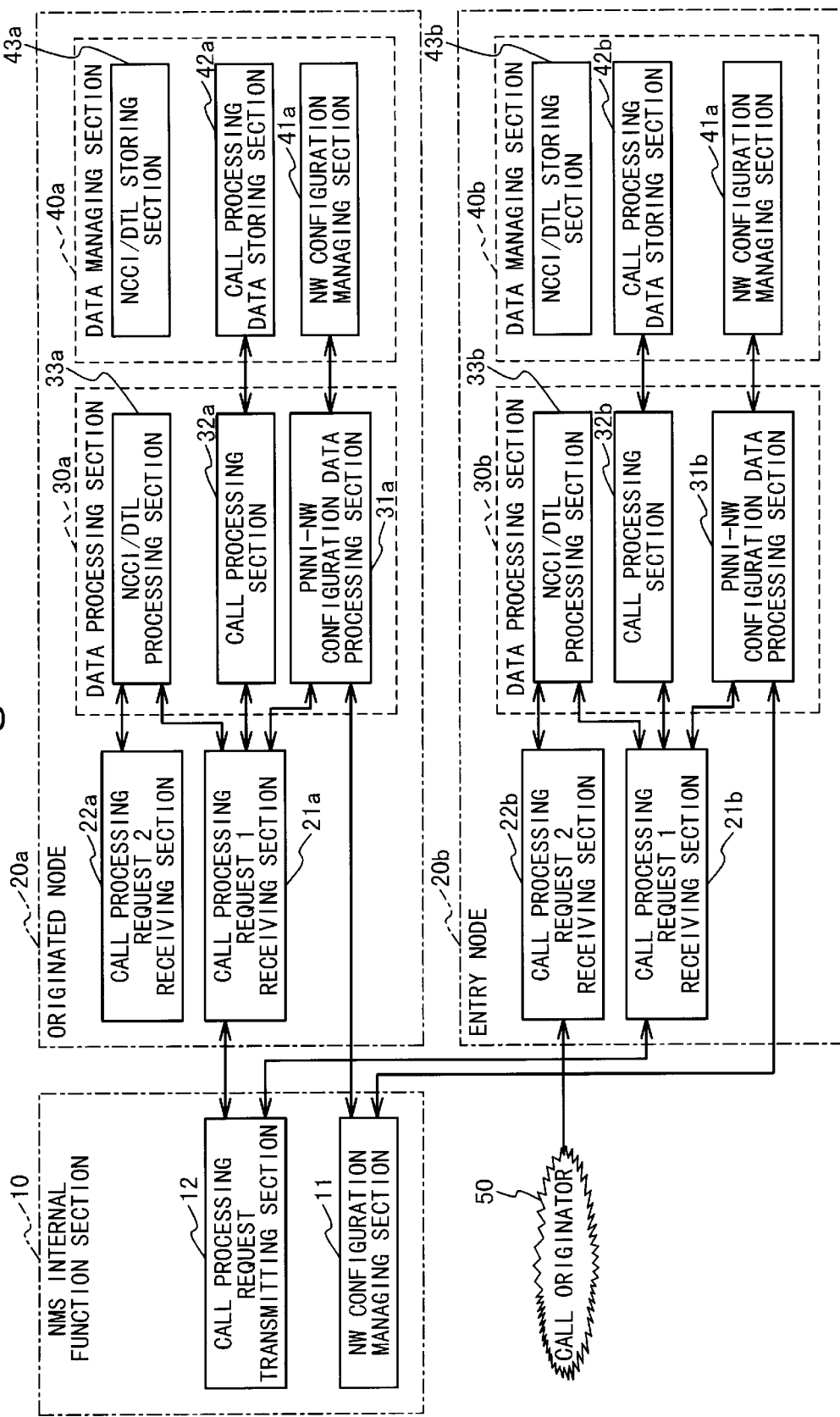
FIG. 1 is a block diagram showing the configuration of a routing S-PVC setting system in a PNNI operation ATM switching apparatus network according to an embodiment of the present invention.

Referring to FIG. 1, an ATM switching apparatus 20a are an originated node of a route. An ATM switching apparatus 20b is a node which is an entrance of a relay peer group, i.e., an entry node in the route passing through the plurality of peer groups. Also, each of the all nodes in the network including other nodes has a function to establish an S-PVC connection in a route which is automatically selected based on topology data of the node under a PNNI operation. An internal function section 10 in an NMS (Network Management System) has a communication section (not shown) for communication between the above node and the operation administrator. The operation administrator acquires PNNI topology data of configuration management sections 41a and 41b through a configuration management section 11 in the NMS. The operation administrator adds the following two data to a call originating request and transmits to the originated node and each entry node from a call processing request transmitting section 12. By this, a routing connection is set based on a S-PVC scheme. One of the above two data is "route data" designated using the topology data and the other is an "identifier" to identify a call uniquely. Each node has a function to receive the call originating request and to establish a S-PVC connection with priority over automatic route selection based on the designated route data. Also, the entry node has a function to receive the identifier and the route data which are contained in the call originating request from the peer group of a previous stage, to identify the received identifier based on the identifier which has been previously received from the operation administrator, and to carry out route selection. In this way, a connection is set based on the route data of the call originating request having the identifier coincident with the designated identifier. Therefore, a S-PVC connection through a plurality of peer groups is set with priority over the automatic route selection function. In this way, it is possible to establish the S-PVC connection on an optional route.

Referring to FIG. 1, the routing S-PVC setting system in the PNNI operation ATM switching apparatus network in the first embodiment is composed of NMS (Network Management System) having the internal function section 10 for managing or controlling a plurality of ATM switching apparatuses, the originated node 20a and the entry node 20b. The ATM switching apparatus as each of the nodes carries out network control based on the PNNI scheme. Also, each of the originated node and the entry nodes has as one feature of the PNNI operation, a function to carry out the route selection for the S-PVC connection with priority based on "designated DTL (Designated Transit List)" as the route data received from the NMS, in addition to the route setting possible list ("DTL"), which the node itself has.

The internal function section 10 of the NMS has the configuration management section 11 and the call processing request transmitting section 12.

The configuration management section 11 in the NMS reads the PNNI topology data as the network configuration data of the plurality of ATM switching apparatuses on the PNNI operation from the data management sections 40a and 40b of the configuration management sections 41a and 41b. The call processing request transmitting section 12 refers to the configuration management section 11 in the NMS to acquire data of the route from the originated node to a desired destination on the PNNI network operation. The call processing request transmitting section 12 can describe the route data designating an optional route over the peer groups in the network in a DTL form. Moreover, the call processing request transmitting section 12 can add the described DTL and an NCCI (Network Call Correlation Identifier) as an identifier for making it possible to identify the request uniquely to the call originating request and transmit the request with the described DTL and/or the NCCI.

The originated node 20a is composed of a call processing request 1 receiving section 21a, a call processing request 2 receiving section 22a, a data processing section 30a and a data management section 40a.

The call processing request 1 receiving section 21a receives the designated DTL and NCCI from the call processing request transmitting section 12 of the NMS, and inquires of the PNNI-NW configuration data processing function section 31a whether or not it is possible to establish the route connection of the designated DTL in the peer group of the PNNI network to which the node itself belongs. When a reply indicating that it is possible is received, the call processing request 1 receiving section 21a transfers the designated DTL and the NCCI to a call process function section 32a.

The call processing request 2 receiving section 22a is a call originating request receiving section for another ATM switching apparatus as a call originator 50. The call processing request 2 receiving section 22a transfers the DTL and NCCI in the received SETUP message to the NCCI/designated DTL process function section 33a. However, the call processing request 2 receiving section 22a does not function because the node is the originated node and does not receive any call originating request from the other ATM switching apparatuses.

The data processing section 30a has the PNNI-NW configuration data processing function section 31a, the call process function section 32a, and the NCCI/designated DTL process function section 33a.

The PNNI-NW configuration data processing function section 31a accesses the configuration management section 41a in the data management section 40a and refers to the route management data to determine how many channels are present from one of the ATM switching apparatuses to another of the ATM switching apparatuses, and how many resources are used.

The call process function section 32a establishes an optimal S-PVC connection based on the DTL built by the node itself in a usual S-PVC connection call originating request and carries out the call originating process. However, when a designated DTL is received from the operation administrator in the issuance of the call originating request, the call process function section 32a carries out the call originating request with priority based on the designated DTL. In case of the latter, the call process function section 32a refers to a call processing data memory section 42a to originate a call meting the designated DTL and NCCI transferred from the call processing request 1 receiving section 21a. Thus, S-PVC connection is established in the peer group.

The NCCI/designated DTL process function section 33a receives the NCCI and the designated DTL from the call processing request 1 receiving section 21a and carries out the comparison of them with the NCCI with NCCI received from the call processing request 2 receiving section 22a. However, the NCCI/designated DTL process function section 33a is not access from the call processing request 2 receiving section 22a and does not function, because the node is the originated node.

The data management section 40a is composed of a configuration management section 41a, the call processing data memory section 42a and an NCCI/designated DTL memory section 43a.

The configuration management section 41a has the data when the whole PNNI network is recognized as the topology of a virtual hierarchical configuration. It should be noted that the DTL built by the node itself is edited here at any time in the aspect of the PNNI operation.

The call processing data memory section 42a has the data of whether resources necessary for call origination by its own ATM switching apparatus is empty.

The NCCI/designated DTL memory section 43a stores the NCCI and the designated DTL transferred from the call processing request 1 receiving section 21a through the NCCI/designated DTL process function section 33a, and receives a read request from the NCCI/designated DTL process function section 33a for the comparison of them with the NCCI received by the call processing request 2 receiving section 22a. However, the NCCI/designated DTL memory section 43a does not function because the node is the originated node and does not receive access from the NCCI/designated DTL process function section 33a.

Like the originated node ATM 20a, the entry node 20b is composed of a call process request 1 receiving section 21b, a call process request 2 receiving section 22b, a PNNI data processing section 30b, a configuration data processing function section 31b, a call process function section 32b, an NCCI/designated DTL process function section 33b, a data management section 40b, a configuration management section 41b, a call processing information memory section 42b, and an NCCI/designated DTL memory section 43b. However, because the ATM switching apparatus itself functions as the entry node, there are differences in the following points.

The call process request 1 receiving section 21b receives the designated DTL and the NCCI transmitted from the call processing request transmitting section 12 of the NMS to the entry node and inquires of the PNNI-NW configuration data processing function section 31b whether or not it is possible to establish the route connection designated by the designated DTL in the peer group of the PNNI network to the node itself belongs as the entry node. When it is determined to be possible, the call process request 1 receiving section 21b transfers the designated DTLs and the NCCI to the call process function section 32b and the NCCI/designated DTL process function section 33b.

The call process request 2 receiving section 22b are an call originating request reception section from the other ATM switching apparatus and as the entry node, it receive an call originating request from the peer group of the front-paragraph. It receives SETUP message as the call originating request and it transfers a DTL and NCCI in the SETUP message to 33b of 30-b data processing section NCCI/designated DTL process function section.

The NCCI/designated DTL process function section 33b stores the NCCI and the designated DTL transferred from the call process request 1 receiving section 21b in the NCCI/designated DTL memory section 43b. The NCCI/designated DTL process function section 33b compares the stored NCCI with the NCCI added as the call originating request from the peer group of the previous stage and transferred from the call process request 2 receiving section 22b. Only when both are coincident with each other, the NCCI/designated DTL process function section 33b starts the call process function section 32b to establish a connection in the peer group as a relay peer group by using the S-PVC scheme. At this time, when the DTL received as the call originating request contains a virtual logical hierarchy, the NCCI/designated DTL process function section 33b edits the designated DTL to add a list of the virtual logical hierarchy to the designated DTL.

Figure 2:
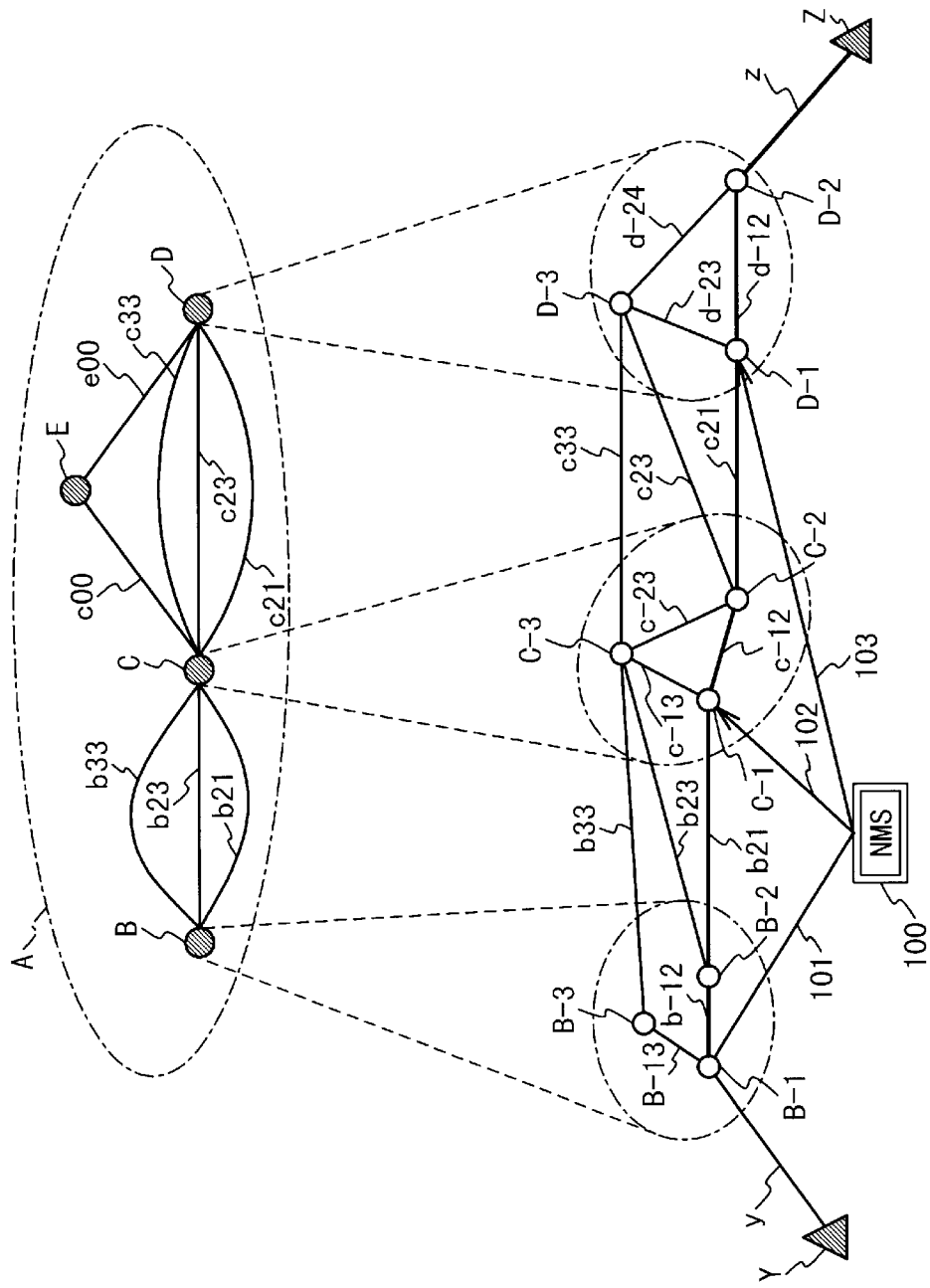
FIG. 2 is a diagram showing a configuration example of the ATM network to describe the routing S-PVC setting system in the PNNI operation ATM switching apparatus network according to the first embodiment of the present invention.

Referring to FIG. 2, the internal function section 10 is provided into the NMS 100, the originated node ATM 20a is the ATM switching apparatus B-1 of the peer group B as a logic node B in virtual logical hierarchy structure topology A. The entry node 20b is one ATM switching apparatus C-1 in the peer group C or one ATM switching apparatus D-1 in the peer group D as a logic node C. Then, the ATM switching apparatus in the PNNI networks communicates with the NMS 100.

Next, an operation of the system in the first embodiment will be described with reference to FIGS. 1 to 3.

The following S-PVC connection is shown as the PNNI network in the first embodiment: a terminal Y, a link y, an ATM switching apparatus B-1, a link b-12, an ATM switching apparatus B-2, a link b21, an ATM switching apparatus C-1, a link c-12, an ATM switching apparatus C-2, a link c21, an ATM switching apparatus D-1, a link d-12, an ATM switching apparatus D-2, a link z, and a terminal Z. It is supposed that it is previously well-known in the configuration management section 11 of the NMS that this route is feasibility and the network is operated such that route acquisition from the terminal to the terminal is possible in the PNNI network.

The call processing request transmitting section 12 of the NMS 100 transmits to the call process request 1 receiving section 21a of the ATM switching apparatus B-1 as the originated node, route designation to the entry node C-1 as a relay peer group C via the peer group B itself, route designation as the virtual logical hierarchy from the node B via the nodes C and D, the designated DTL edited to contain these two route designation elements, and the originated call identifier NCCI. Similarly, the call processing request transmitting section 12 of the NMS 100 transmits to the call process request 1 receiving section 21b of the ATM switching apparatus C-1 as the entry node, the designated DTL edited as the route designation to the entry node D-1 as relay peer group D via the self peer group C and the NCCI which is same as the originating call identifier transferred to the originated node. Also, the call processing request transmitting section 12 transmits the designated DTL and the NCCI edited as the route designation to the terminal Z via the self peer group D to the call process request 1 receiving section 21b of the ATM switching apparatus D-1 as the entry node, too. It should be noted that it is supposed that the connection from the ATM switching apparatus B-1 to the terminal Y is already established.

The designated DTL received by the ATM switching apparatus B-1 is as follows: [B-1(b-12), B-2 (b21)], [B(b21), C(c21), D(z)]. The designated DTL received by the ATM switching apparatus C-1 is as follows: [C-1(c-12), C-2 (c21)]. The designated DTL received by the ATM switching apparatus D-1 is as follows: [D-1(d-12), D-2(z)]. The originating call identifiers NCCI received by these ATM switching apparatus are B-1-y. It should be noted that in the description format of O(o), O is a node ID and o is a port ID. Also, in the description format like [ ], [ ] of the first term is a route designation to the lowest layer when the description in [ ] is regarded as the virtual logical hierarchy. The description in

[ ] as the next term is the route designation to a layer higher by one than the layer of the virtual logical hierarchy which has been recognized in the previous term. It should be noted that the description format of [ ] is not limited to the above-mentioned 2-layer hierarchy. The present invention can be applied to the PNNI network of multiple layer hierarchy such as 3-layer hierarchy and 4-layer hierarchy. In such a case, it is possible to handle the multiple layer hierarchy by producing a row of [ ] for each layer to describe the designated route in the layer.

Figure 3:
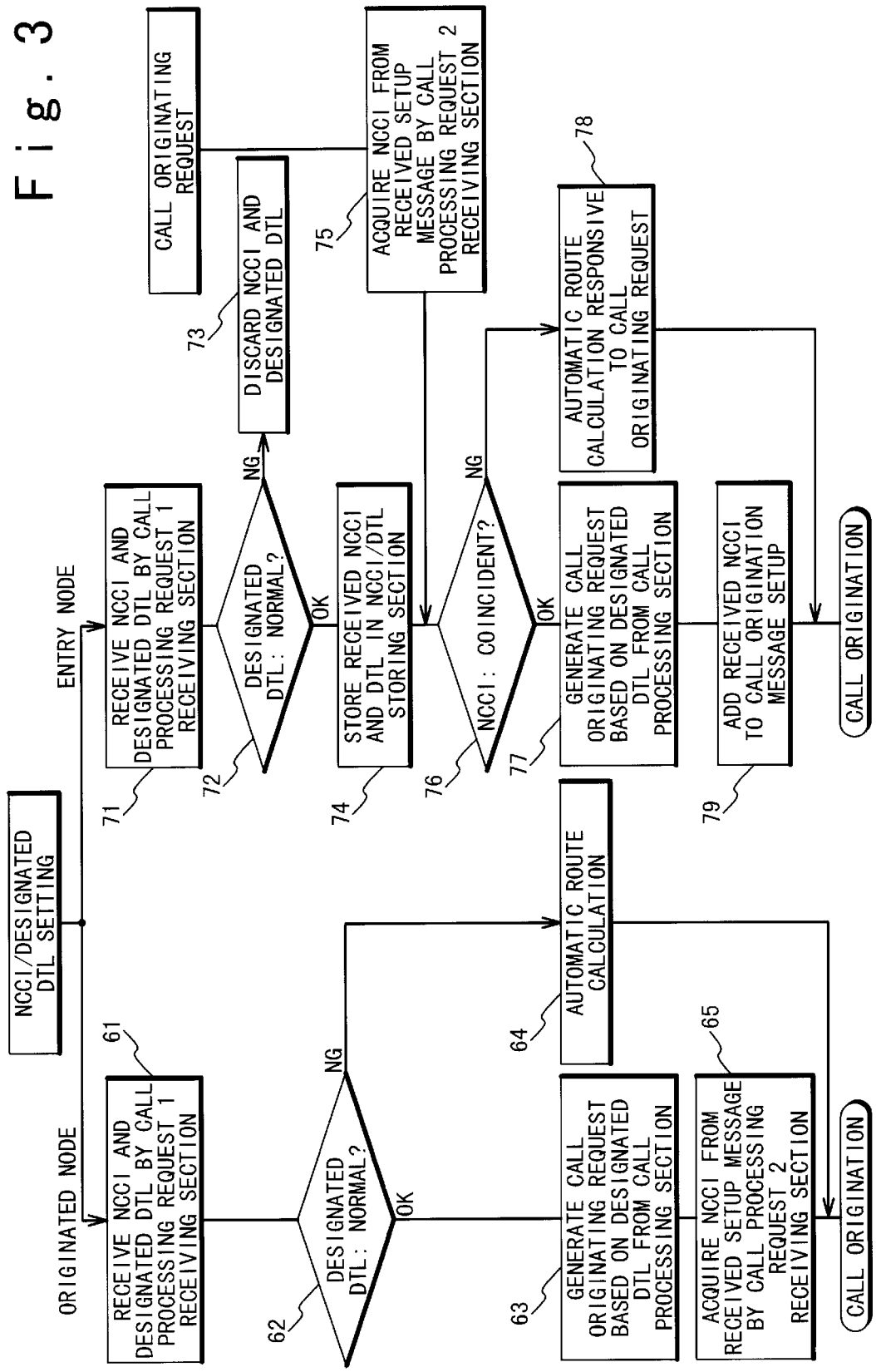
FIG. 3 is a flow chart showing the operation of the routing S-PVC setting system in the PNNI operation ATM switching apparatus network according to the first embodiment of the present invention.

In the ATM switching apparatus B-1, a step 61 of FIG. 3 is carried out. At the step 61, the call processing request 1 receiving section 21a refer to the configuration data processing function section 31a to check whether or not it is possible to establish a channel route in self peer group B based on the designated DTL, or whether or not the designated DTL is normal, with priority over the usual automatic route calculating process. It judges the normality of the received designated DTL (Step 62). When it is determined that the channel cannot be established, the designated DTL and NCCI which have been received are discarded and the usual automatic route calculating process is carried out. Thus, the route is set to the terminal Z (step 64). Then, a call originating request is issued in accordance with the standard of ATM-Forum. In this case, the guarantee of the designated route is passed away. Also, the designated DTL and NCCI which have been received by the entry node as a relay node lose the intention because the originated call identifier NCCI is discarded. Contrarily, when it is determined that the designated DTL is normal, a SETUP message is prepared and transmitted through the link b-12 to the ATM switching apparatus B-2 which is designated as the following node (Step 63). It should be noted that B-1-y as the designated NCCI is contained in the originating call SETUP message (Step 65).

The ATM switching apparatus B-2 belongs to the same peer group as the ATM switching apparatus B-1 and the guarantee of the DTL in the call originating request is already completed. Therefore, the ATM switching apparatus B-2 transmits the originating call SETUP message containing the designated NCCI, B-1-y, to the ATM switching apparatus C-1 through the link b21 based on the description of the DTL. The DTL description for the lowest layer in the designated DTL is deleted or removed to meet the standard of ATM-Forum when the SETUP message is sent out from the peer group B. Therefore, the transmitted DTL at that time is as follows: [B(b21), C(c21), D(z)].

A step 71 is carried out in the ATM switching apparatus C-1 or ATM switching apparatus D-1 as the entry node. At the step 71, the call process request 1 receiving section 21b refers to the configuration data processing function section 31b to check whether the designated DTL is normal (Step 72). When the designated DTL is determined to be normal, the call process request 1 receiving section 21b stores the DTL and the NCCI in the NCCI/designated DTL memory section 43b (Step 74). However, the normality determining process of the designated DTL in the entry node is different from the normality determining process of the designated DTL at the originated node. When the designated DTL is determined to be not normal, the designated DTL and the NCCI are discarded at all the entry nodes (Step 73). Then, it is notified to the NMS 100 that the set of the designated route from the terminal Y to the terminal Z is not fulfilled. Thereafter, this process is ended. It should be noted that the setting of S-PVC connection based on the DTL received from the originated node in this case is carried out based on the automatic route calculating process of the ATM switching apparatus C-1 as the entry node. When the designated DTL is determined to be normal and the entry node is in the waiting state, the call originating request is received from the originated node (Step 75). The ATM switching apparatus C-1 receives the SETUP message and determines whether the NCCI in the SETUP message is coincident with the NCCI related to the designated DTL for the peer group C to have previously received from the NMS 100 (Step 76). When the coincidence is not obtained, the ATM switching apparatus C-1 recognizes that the call originating request is not for the designated DTL, and carries out the automatic route calculating process. Thereafter, the process advances to the next call originating request process (Step 78). On the other hand, when the coincidence is obtained, the DTL received by the call process request 2 receiving section 22b and the designated DTL received by the call process request 1 receiving section 21b are combined with each other, and the route is set in the self peer group and a route setting request is issued to the following peer groups. These processes are carried out at the same time with priority over the automatic route calculating process. The DTL and NCCI transmitted to the ATM switching apparatus C-2 as the next node at this time are as follows: [C-1(c-12), C-2(c21)], [B(b21), C(c21), D(z)], and B-1-y (Step 79).

The processing of ATM switching apparatus C-2 is same as that of the ATM switching apparatus B-2, and the DTL description in the lowest layer is deleted and then the DTL is transmitted to the ATM switching apparatus D-1. Therefore, the transmitted DTL is as follows: [B(b21), C(c21), D(z)].

The processing of the ATM switching apparatuses D-1 and D-2 is same as that of the ATM switching apparatuses C-1 and C-2.

Through the above process, the S-PVC connection designated from the NMS 100 is established from the terminal Y to the terminal Z.

It should be noted that the originated node ATM 20a and the entry node ATM 20b do not have to be always provided on the ATM switching apparatuses as the originated node and each entry node which are described above. If the functions of both are provided on all ATM switching apparatuses in the PNNI network, the ATM switching apparatuses capable of processing the DTL increase and the S-PVC connection can be established on the route selected from among many routes.

Also, the virtual logical hierarchy of the PNNI network is not limited to 2-layer hierarchy described above. The present invention can be applied to a multi-layer hierarchy PNNI network, too. At this time, the DTL description of the designated DTL is increased in accordance with the number of layers in the multi-layer hierarchy.

Moreover, it is possible to specify the route based on the designated DTL when usual SVC connection is established. Therefore, it is never limited to the rout specification for the S-PVC connection.

Moreover, a plurality of DTLs are provided in the node to have priorities, and described in the route data. Therefore, even if the first desired route designated by the operator cannot be acquired, the next desired route can be acquired.

Next, the system according to the second embodiment of the present invention will be described. In the second embodiment, the call process procedure in case of the acquisition of a S-PVC connection route of the present invention is replaced with another procedure. That is, in the first embodiment, the common identifier NCCI is used to identify the call originating request SETUP message. However, in the second embodiment, instead of the common identifier NCCI, the arrival ATM address and the origination ATM address described in the fields of the destination number (CdPN: Called Party Number) and the request origin number (CgPN: Calling Party Number) in the call originating request SETUP message are used as the new originating call identifier.

The operation in the DTL specification establish call system using CdPN•CgPN as an originating call identifier on the operation of the PNNI network configuration of FIG. 2 will be described with reference to FIGS. 4 and 5.

Figure 4:
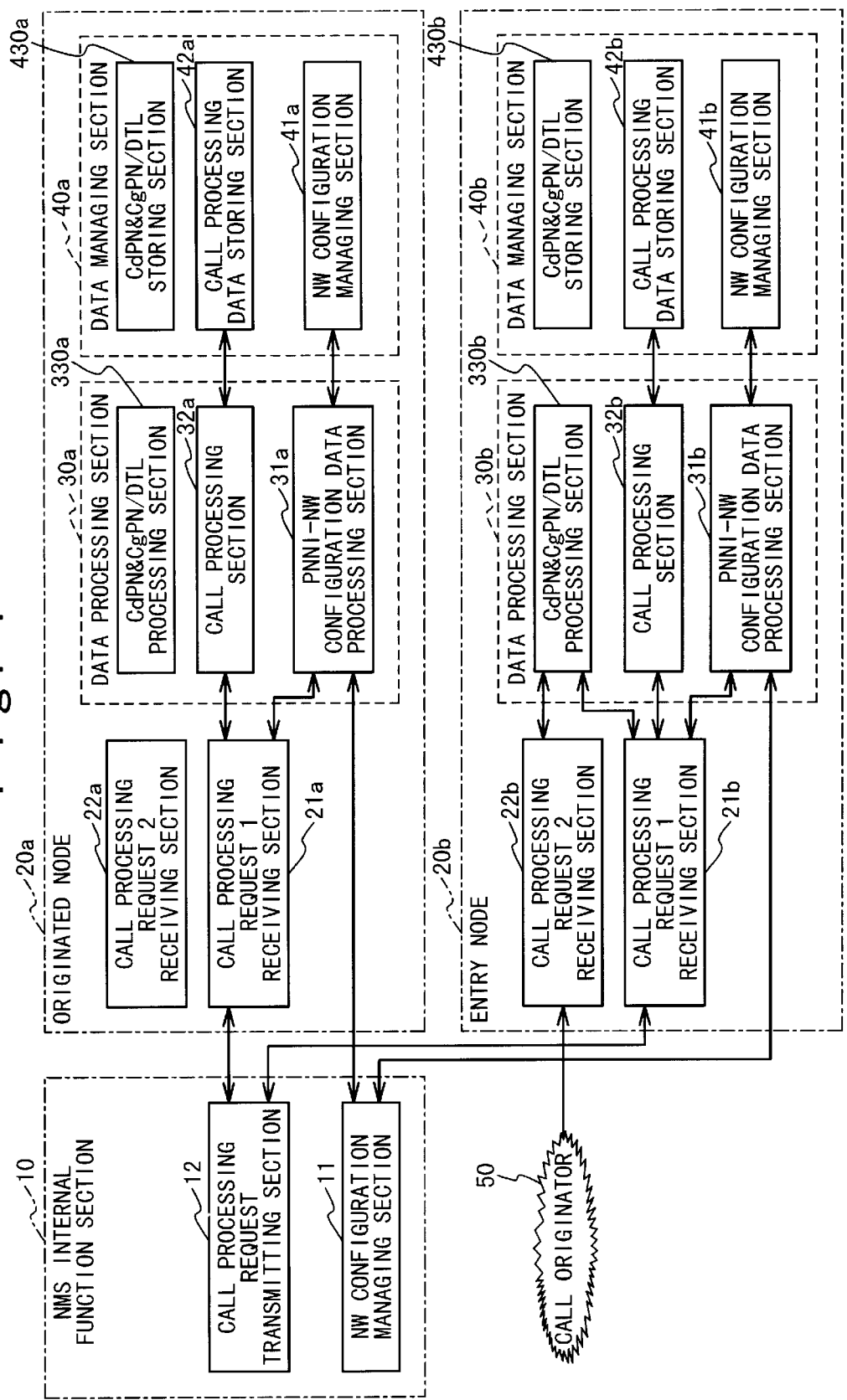
FIG. 4 is a block diagram showing the configuration of the routing S-PVC setting system in the PNNI operation ATM switching apparatus network according to a second embodiment of the present invention.

Referring to FIGS. 4 and 5, the second embodiment is different from the first embodiment in CdPN•CgPN/DTL process function sections 330a and 330b in the data processing section 30a and 30b, and CdPN•CgPN/designated DTL storage section 430a and 430b in the data management section 40a and 40b.

It is supposed that the following S-PVC connection is established like the first embodiment; a terminal Y, a link y, an ATM switching apparatus B-1, a link b-12, an ATM switching apparatus B-2, a link b21, an ATM switching apparatus C-1, link c-12, ATM switching apparatus C-2, a link c21, an ATM switching apparatus D-1, a link d-12, an ATM switching apparatus D-2, a link z, and a terminal Z.

The designated DTL received by the ATM switching apparatus B-1 is as follows: [B-1(b-12), B-2(b21)], [B(b21), C(c21), D(z)]. The designated DTL received by the ATM switching apparatus C-1 is as follows: [C-1(c-12), C-2 (c21)]. The designated DTL received by the ATM switching apparatus D-1 is as follows: [D-1(d-12), D-2(z)]. Also, it is supposed that the call origination identifiers CdPN•CgPN received by these ATM switching apparatuses is B-1-y-2.

The ATM switching apparatus B-1 receives CdPN•CgPN, the designated DTL by the call processing request 1 receiving section 21a (Step 81) and judges the normality of the designated DTL subsequently (Step 82). When the normality is not obtained, the ATM switching apparatus B-1 discards the received designated DTL and CdPN•CgPN and establishes a route to the terminal by carrying out a usual route calculating process (Step 84). When the normality is obtained, the ATM switching apparatus B-1 transmits a SETUP message to the ATM switching apparatus B-2 which is designated as the following node using the link b-12 (Step 83). It should be noted that B-1-y-2 as the common identifier is contained in the call origination SETUP message (Step 85).

The route guarantee has been already finished for the call originating request received from the ATM switching apparatus B-1 because the ATM switching apparatus B-2 belongs to the same peer group as the ATM switching apparatus B-1. Therefore, the ATM switching apparatus B-2 transmits the call origination SETUP message, which includes the common identifier B-1-y-2, to the ATM switching apparatus C-1 using link b21. It should be noted that the DTL description when the call originating request is outputted from the peer group B is edited as follows to meet the ATM-Forum standard: [B(b21), C(c21), D(z)].

Each of the ATM switching apparatus C-1 and the ATM switching apparatus D-1 as the entry node receives CdPN•CgPN, the designated DTL by the call process request 1 receiving section 21b (step 91) and judges the normality of the designated DTL subsequently (Step 92). The ATM switching apparatus stores the designated DTL and B-1-y-2 in the CdPN•CgPN/designated DTL memory section 430b when the normality is obtained (step 94) and waits for a call originating request from the originated node. When the SETUP message is received by the call process request 2 receiving section 22b (step 95), the ATM switching apparatus C-1 judges whether the common identifier CdPN•CgPN contained in the SETUP message is coincident with B-1-y-2 stored in the CdPN•CgPN/designated DTL memory section 430b (Step 96). When the coincidence is not obtained, the ATM switching apparatus C-1 does not recognize that the designated DTL is not a call originating request, and carries out the usual automatic route calculating process and then moves to a process for the following call originating request (Step 98). When the common identifiers are coincident with each other, the ATM switching apparatus C-1 adds the designated DTL stored in the CdPN•CgPN/designated DTL memory section 430b to the DTL received from the peer group B of the previous stage by the call process request 2 receiving section 22b without carrying out the automatic route calculation process, and then carries out the routing in the self peer group and the generation of a routing request to the following peer group (Step 97). The DTL and the common identifier CdPN•CgPN transmitted to the ATM switching apparatus C-2 as the next node at this time are as follows: [C-1(c-12), C-2(c21)], [B(b21), C(c21), D(z)], B-1-y-2 (Step 99).

The process of the ATM switching apparatus C-2 is same as that of the ATM switching apparatus B-2, and a DTL description in the lowest layer is deleted in the DTL transmitted to the ATM switching apparatus D-1 in the same way. Therefore, the DTL description is as follows: [B(b21), C(c21), D(z)].

The processes of the ATM switching apparatuses D-1 and D-2 are same as those of the ATM switching apparatuses C-1 and C-2.

An S-PVC connection designated by the NMS 100 from the terminal Y to the terminal Z is established through the above processes.

As described above, in the second embodiment of the present invention, CdPN•CgPN can be used as the common identifier.

As described above, according to the present invention, the originated node adds the route data to the SETUP message, and sets the S-PVC based on the route data with priority over an optimal route as the PNNI topology data which is derived from the internal DTL. Thus, the S-PVC connection designated by the operation administrator can be established in the single peer group.

Also, the route data is supplied to the entry node which has the entry node function section of 20b such that the S-PVC connection is set based on the route data. Therefore, the S-PVC connection designated by the operation administrator can be established over a plurality of peer groups. It should be noted that the identifier of the call originating request is related to the route data.

It is sufficient to introduce the system of the present invention to only the originated node and each entry node. It is not necessary to introduce the system to all the ATM switching apparatuses in the network. Therefore, the S-PVC connection designated by the operation administrator can be established even for the PNNI network composed of the ATM switching apparatuses of the plurality of vendors.

Also, the S-PVC connection can be collectively set to the originated node and the entry nodes. Conventionally, for the establishment of the PVC connection, it is necessary to set the connection for every link between the ATM switching apparatuses. Therefore, accesses to the ATM switching apparatus can be reduced for the establishment of the S-PVC connection, compared with the establishment of the PVC connection.

Also, when a fault has occurred in the S-PVC connection, a substitution route can be automatically established using the connection retry function on the occurrence of the fault and the automatic route selecting function of the originated node. Therefore, the route can be secured even in case of the fault occurrence, in addition of the route establishment in the PNNI network.

What is claimed is:

1. A method of establishing an S-PVC (soft private virtual connection) connection in a PNNI (private network-network interface) network of a plurality of peer groups, each of which includes at least an ATM (asynchronous transfer mode) switching apparatus as an ATM node, comprising the steps of:

(a) setting a first identifier and first designated route data associated with said S-PVC channel in each of said plurality of peer groups;

(b) in said ATM node in each of said plurality of peer groups, receiving a call originating request including second designated route data and a second identifier;

(c) comparing said first identifier and said second identifier;

(d) generating a next call originating request containing third designated route data as said second designated route data and said second identifier for a next node based on said first and second designated route data and said second identifier when said first identifier and said second identifier are coincident with each other;

(e) transmitting said next call originating request to said next node; and (f) repeating said steps (b) to (e) over each of said plurality of peer groups.

2. The method according to claim 1, wherein said first designated route data is designated optionally.

3. The method according to claim 1, wherein each of said first and second identifiers is an NCCI (network call correlation identifier).

4. The method according to claim 1, wherein each of said first and second identifiers contains at least one of a destination number CdPN: called party number) and a source number (CgPN: calling party number).

5. The method according to claim 1, wherein said one peer group includes said ATM node, and
said step (a) comprises the step of:
(g) determining based on said first designated route data, whether establishment of said S-PVC connection is possible; and
(h) setting said first designated route data and said first identifier when it is determined that the establishment of said S-PVC connection is possible.

6. The method according to claim 5, wherein said step (a) further comprises the step of:
discarding said first designated route data and said first identifier when it is determined that establishment of said S-PVC connection is not possible.

7. The method according to claim 5, wherein said step (g) comprises the step of:
determining whether the establishment of said S-PVC connection is possible, based on whether said first designated route data is correct from network configuration data.

8. The method according to claim 5, wherein said step (g) comprises the step of:
determining whether establishment of said S-PVC connection is possible, based on whether resources are remained for said S-PVC connection.

9. The method according to claim 1, wherein said one peer group includes said ATM node and another ATM node, and
said step (a) comprises the step of:
(i) said ATM node determining based on said first designated route data, whether establishment of said S-PVC connection is possible;
(j) said ATM node setting said first designated route data and said first identifier in said ATM node when it is determined that the establishment of said S-PVC connection is possible; and
(k) said another ATM node setting said first designated route data and said first identifier in said another ATM node without determining whether the establishment of said S-PVC connection is possible.

10. The method according to claim 9, wherein said step (i) comprises the step of:
determining whether the establishment of said S-PVC connection is possible, based on whether said first designated route data is correct from network configuration data.

11. The method according to claim 9, wherein said step (i) comprises the step of:
determining whether establishment of said S-PVC connection is possible, based on whether resources are remained for said S-PVC connection.

12. The method according to claim 1, further comprising the step of:
(l) discarding said call originating request when it is determined that said first identifier and said second identifier are not coincident with each other.

13. The method according to claim 12, further comprising the step of:
carrying out an automatic routing process to determine a route, when it is determined that said first identifier and said second identifier are not coincident with each other.

14. The method according to claim 1, wherein said first and second designated route data are designated based on a topology data of said PNNI network.

15. The method according to claim 14, wherein said first and second designated route data are described in DTL format, and said step (d) comprises the step of:

generating said third designated route data having virtual logic hierarchical representation.

16. The method according to claim 15, wherein said step (d) comprises the step of:

deleting a portion of said designated route data corresponding to a lowest layer of virtual logic hierarchical representation, when said call originating request is received.

17. A ATM switching apparatus comprising:

a memory section which stores data indicating whether resources necessary for call origination are not used;

a configuration management section which stores topology data indicating virtual hierarchical configuration of a PNNI network to which a peer group belongs, said ATM switching apparatus belonging to said peer group;

a first receiving section which receives a call processing request having a first designated DTL (designated transit list) and a first identifier, and stores said first designated DTL and said first identifier in said memory section, when it is determined that establishment of an S-PVC (soft private virtual connection) connection is permitted;

a second receiving section which receives a call originating request having a second designated DTL and a second identifier; and a call processing section which generates a new call originating request having a third designated DTL and said second identifier based on said first designated DTL and said second designated DTL, when said first and second identifiers are coincident with each other.

18. The ATM switching apparatus according to claim 17, wherein said first designated DTL is designated optionally.

19. The ATM switching apparatus according to claim 17, wherein each of said first and second identifiers is an NCCI (network call correlation identifier).

20. The ATM switching apparatus according to claim 17, wherein each of said first and second identifiers contains at least one of a destination number CdPN: called party number) and a source number (CgPN: calling party number).

21. The ATM switching apparatus according to claim 17, further comprising:

a configuration managing section which refers to said configuration management section to determine whether resources necessary for the establishment of said S-PVC connection are remained, and wherein said first receiving section stores said first designated DTL and said first identifier in said memory section, when it is determined that the resources necessary for the establishment of said S-PVC connection are remained.

22. The ATM switching apparatus according to claim 21, wherein said first receiving section discards said first designated DTL and said first identifier when it is determined that the resources necessary for the establishment of said S-PVC connection are remained.

23. The ATM switching apparatus according to claim 21, wherein said first receiving section stores said first designated DTL and said first identifier in said memory section when it is determined by another ATM switching apparatus which belongs to same peer group as said ATM switching apparatus that the resources necessary for the establishment of said S-PVC connection are remained.

24. The ATM switching apparatus according to claim 17, further comprising:

an identifier processing section which compares said first identifier and said second identifier, and wherein said call processing section generates said new call originating request based on said first designated DTL and said second designated DTL, when said first and second identifiers are coincident with each other.

25. The ATM switching apparatus according to claim 24, further comprising:

a transmitting section which transmits said new call originating request to a next node.

26. The ATM switching apparatus according to claim 24, wherein said call processing section discards said call originating request when it is determined that said first identifier and said second identifier are not coincident with each other.

27. The ATM switching apparatus according to claim 24, further comprising:

a routing section which carries out an automatic routing process to determine a route, when it is determined that said first identifier and said second identifier are not coincident with each other.

28. The ATM switching apparatus according to claim 24, wherein said call processing section deletes a portion of said second designated DTL corresponding to a lowest layer and generates the new call originating request having a third designated DTL based on said first designated DTL and said second designated DTL, when said first and second identifiers are coincident with each other.

* * * * *